Nov. 9, 1926.                                                    1,606,127
                             G. F. KOLB
         BEARING FOR CLUTCH RELEASING DEVICES AND OTHER PURPOSES
                      Filed April 3, 1923        2 Sheets-Sheet 1
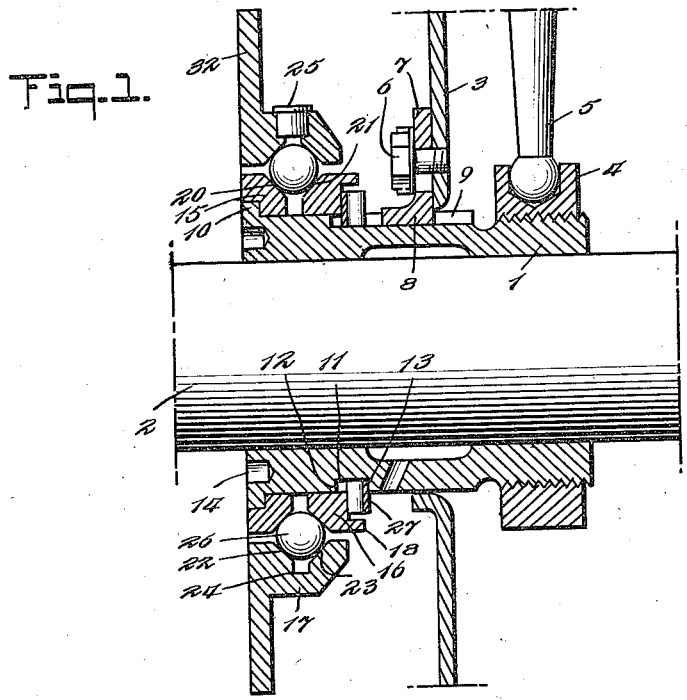
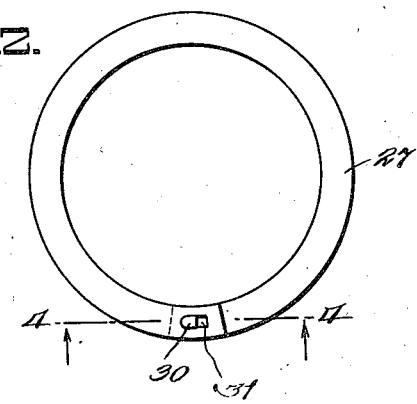
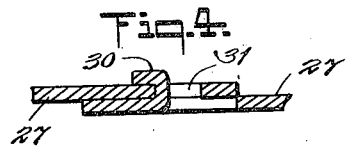
INVENTOR
George F. Kolb
BY
Meyers & Cavanagh
          ATTORNEYS.

Nov. 9, 1926.  1,606,127
G. F. KOLB
BEARING FOR CLUTCH RELEASING DEVICES AND OTHER PURPOSES
Filed April 3, 1923   2 Sheets-Sheet 2

INVENTOR
George F. Kolb
BY
Meyers & Cavanagh
ATTORNEYS.

Patented Nov. 9, 1926.

1,606,127

UNITED STATES PATENT OFFICE.

GEORGE F. KOLB, OF FAIRFIELD, CONNECTICUT, ASSIGNOR TO THE BULLARD MACHINE TOOL COMPANY, OF BRIDGEPORT, CONNECTICUT, A CORPORATION OF CONNECTICUT.

BEARING FOR CLUTCH-RELEASING DEVICES AND OTHER PURPOSES.

Application filed April 3, 1923. Serial No. 629,579.

My invention relates to anti-friction bearings especially adapted for use as thrust bearings for clutch shifters, and also available for other uses where some or all conditions are similar. The invention also includes a shifter sleeve adapted as a mounting for the bearing.

The general object of the invention is to provide an anti-friction or ball bearing suitable for the above and other purposes which may be economically manufactured and readily put in position on and removable from a suitable carrier such as a shifter sleeve.

The characteristics and advantages of the invention are further sufficiently described in connection with the following detail description of the accompanying drawings which show certain exemplifying embodiments of the invention. After considering these, persons skilled in the art will understand that many variations may be made within the principles of the invention, and I do not limit myself to details except as claimed hereafter.

Figure 1 is a longitudinal section of a bearing and shifter sleeve embodying the invention in one form.

Figures 2, 3 and 4 are detail views of the spring retainer.

Figure 5:
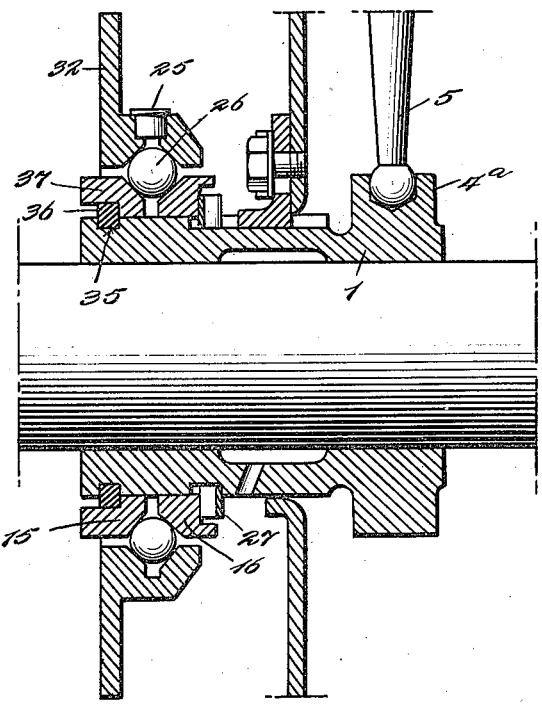
Figure 5 is a longitudinal section showing a modification of the bearing mounting.

The shifter sleeve 1, Fig. 1, is slidably mounted on a clutch shaft 2, or may otherwise be slidably supported in a housing member 3 of a clutch, and in that case the bore of the shifter sleeve may be sufficiently large to provide clearance between the sleeve and the clutch shaft. At its inward end the shifter sleeve has suitable means such as a flange or ring 4 for actuating a clutch. In this particular instance the ring 4 is screw-threaded on the inner end of the sleeve and is provided with sockets in which are located the inward ends of clutch releasing levers 5. This arrangement provides for adjustment of the clutch by relative rotation of the sleeve and ring 4, and in such a case and also for other reasons, it is desirable to connect the shifter to rotate with a driving part of the clutch structure such as the housing member 3. For that purpose the housing member has secured to it by a screw 6 a fitting 7 provided with a toe 8 engaged in a slot or channel 9 on the outer surface of the sleeve, this arrangement permitting the sleeve to slide longitudinally for clutch operation and compelling it to rotate positively with the driving clutch structure. At the outer end of sleeve 1 is a flange 10, and the sleeve also has an annular groove 11 provided with shoulders 12 and 13 and spaced away from flange 10. Sockets 14 may be provided in the outer end of the sleeve to receive a suitable tool such as a spanner by which the sleeve may be rotated to adjust the clutch releasing action.

The bearing proper comprises inner rings 15 and 16 and an outer ring 17. Ring 15 may be of rectangular section except for the ball race formed thereon, and in that case may rest against the inner face of sleeve flange 10, but preferably as shown the outward end of the ring bore is countersunk to receive flange 10. The inward end of ring 16 is recessed, providing an annular flange 18. The rings 15 and 16 are provided with conical race surfaces 20 and 21 respectively, and while these surfaces may in some cases be of curved cross section, more desirably they are flat or truly conical as shown, since flat race surfaces are sufficient for the loads and speeds to be provided for in bearings of this class. The outer ring is provided with similar race surfaces 22 and 23, these forming an annular groove and usually this groove is enlarged by an annular recess 24 between the race surfaces, this recess or channel being usually provided to permit proper formation of the race surfaces. A substantial amount of lubricant is retained in the groove or channel 24, and lubricant may be introduced in any suitable way, for instance by an oiler fitting 25 of any suitable or standard type inserted in the outer ring.

While in some cases a ball spacer may be used, preferably this is dispensed with and the raceway formed between the several race surfaces is filled with a full complement of balls 26. A spring retaining ring 27 is inserted in groove 11. This ring, as best shown in Figures 2, 3 and 4, is desirably in the form of a strip or ribbon of spring metal bent into sinuous formation to provide bulges 28 and 29 in alternating relation at opposite sides of the ring as sufficiently shown in Figure 3. To facilitate its positioning the ring is usually split and the ends are connected after assembly by a tongue 30 formed on one end portion of the ring and passing through a slot 31 in the other end portion, Figures 2 and 4.

The outer ring 17 is provided with a flange 32 for engagement by any suitable or ordinary clutch shifting yoke, or the ring may be otherwise formed or any suitable or usual attachments may be provided for the actuation of the outer ring by a shifter.

Before the shifter sleeve 1 is placed in the clutch, and before ring 4 is placed on the sleeve, the inner rings 15 and 16 are slipped over the inward end of the shifter sleeve, the inner diameter of the rings being sufficiently large to pass freely over the screw-thread thereon. The inner ring is located against flange 10, the outer ring is properly positioned, and while ring 16 is maintained in a convenient position away from the other rings the balls are inserted, ring 16 is moved up to its proper position as shown in Figure 1, and the retaining ring 27 is snapped in place and secured. The alternate humps 28 and 29 of the retaining ring engage against shoulder 13 and the adacent face of ring 16 respectively, and urge ring 16 with moderate spring pressure toward ring 15, and the entire bearing is thus held in assembled relation in an obvious way. Flange 18 overlying the retaining ring tends additionally to hold the ring in place.

Any active thrust on the bearing when used for a clutch release bearing as shown, is in a direction which urges race surface 23 toward surface 20, or in other words is such that the thrust is taken up by rigidly mounted members of the bearing, and the retaining ring 27 therefore does not have to support any active thrust and there is no tendency to move the bearing rings apart.

The described construction and arrangement of parts dispenses to a considerable extent with care and cost in manufacture since the race surfaces may be produced by simple grinding operations, and if each race surface is not located in exactly correct position, for instance, if it is ground a little too deep or a little too shallow, this variation will be taken care of in the assembly of the bearing since the rings are set up or held in proper position with their races in proper contact with the balls, by the yieldable retainer 27.

Figure 5 shows a modification in which no adjustment of the shifter sleeve is provided, and the member 4ª, which is in engagement with the releasing levers 5, is therefore formed as an integral flange on the shifter sleeve 1. This arrangement prevents the inner bearing rings from being passed over the inward end of the shifter sleeve. Flange 10 of Fig. 1 is therefore omitted, and an annular groove 35 is provided in the sleeve near its outer end. The bearing is then assembled in a similar way except that the inner rings 15 and 16 are passed over the outer end of the shifter sleeve and ring 15 is retained by a split ring 36 inserted in groove 35. Desirably ring 15 has a flange 37 overlying the locking ring 36 and positively holding it in place. In this case when the inner bearing rings are first passed over the shifter sleeve they are moved inward far enough to permit insertion of the locking ring 36, and the ring 15 is moved back into the position shown in Fig. 5, whereupon flange 37 is engaged outside the locking ring, and the further assembly operations are performed substantially as described in connection with Fig. 1.

Figure 6:
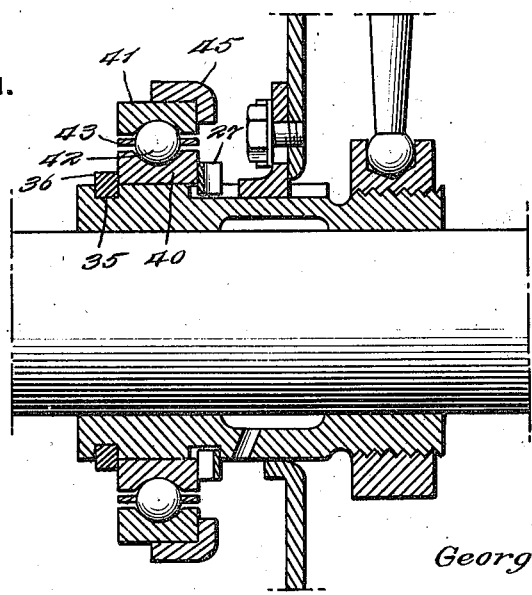
Figure 6 is a longitudinal section showing the adaptation of the bearing mounting to one ordinary type of annular bearing.

Figure 6 shows the bearing mounting adapted for a representative form of annular ball bearing, consisting of an inner ring 40, outer ring 41, and balls 42 provided with a spacer 43. The mounting or bearing retaining members are substantially the same as in Fig. 5. The inner ring 40 is held in place by the locking ring 36 and the spring retaining ring 27, and the spring ring in this case simply serves to hold the bearing in proper position and does not retain the parts of the bearing proper in assembled relation. Fig. 6 shows one ordinary form of shifter yoke ends 45 in operative relation to the outer bearing ring 41.

I claim:

1. A bearing mounting for the purposes described, comprising a cylindrical member, an annular positive retaining member thereon, the cylindrical member having an annular groove spaced from said retaining member, a yieldable retainer in said groove, and a bearing structure mounted about the cylindrical member and held against said positive retaining member by resilient pressure of said yieldable retainer.

2. A bearing mounting for the purposes described, comprising a cylindrical member, an annular positive retaining member thereon, the cylindrical member having an annular groove spaced from said retaining member, an annular spring retainer of sinuous formation located in said groove, and a bearing structure mounted on said cylindrical member and yieldingly retained by said spring retainer against said positive retaining member.

3. A bearing mounting for the purposes described, comprising a cylindrical member, an annular projecting retaining flange thereon, the cylindrical member having an annular groove spaced from said retaining flange, a spring retainer in said groove, and a bearing structure mounted about the cylindrical member and held against said flange by resilient pressure of said spring retainer.

4. A bearing mounting for the purposes described, comprising a cylindrical member, an annular projecting retaining flange thereon, the cylindrical member having an annular groove spaced from said retaining flange, an annular spring retainer of sinuous formation located in said groove, said spring retainer being split and being provided with means for securing its ends together, and a bearing structure mounted on said cylindrical member and yieldingly retained by said spring retainer against said retaining flange.

5. An anti-friction bearing for the purposes described, comprising a cylindrical mounting, separate inner bearing rings on the mounting and having confronting angular race surfaces, means on said mounting positively positioning one of the inner rings and means on said mounting yieldably positioning the other ring and tending to urge it toward the ring first named, an outer bearing ring having integrally formed therein confronting angular race surfaces, and balls in the raceway between the race surfaces.

6. An anti-friction bearing for the purposes described comprising a cylindrical mounting, separate inner bearing rings on the mounting and having confronting angular race surfaces, means on said mounting positively positioning one of the inner rings and means on said mounting yieldably positioning the other ring and tending to urge it toward the ring first named, an outer bearing having integrally formed therein confronting angular race surfaces, and balls in the raceway between the race surfaces, the outer ring having means for its actuation by a shifter-yoke.

7. An anti-friction bearing for the purposes described, comprising a cylindrical mounting, separate inner bearing rings on the mounting and having confronting angular race surfaces, means on said mounting positively positioning one of the inner rings and means on said mounting yieldably positioning the other ring and tending to urge it toward the ring first named, an outer bearing ring having integrally formed therein confronting angular race surfaces and a lubricant retaining groove therebetween, and balls in the raceway between the race surfaces.

8. A clutch-releasing bearing adapted for cooperation with a shifter sleeve, and comprising separate inner rings mounted on the sleeve and provided with confronting conical race surfaces, the sleeve being provided with a flange engaging and positively locating one of said bearing rings, the sleeve also having an annular shouldered groove spaced away from said flange, a yieldable retaining ring located in the groove and bearing against said shoulder and the other of said bearing rings to yieldably position the bearing and hold it in assembled relation, an outer bearing ring having confronting conical race surfaces, and balls in the raceway between the race surfaces.

9. A clutch-releasing bearing adapted for cooperation with a shifter sleeve, and comprising separate inner rings mounted on the sleeve and provided with confronting conical race surfaces, the sleeve being provided with a flange engaging and positively locating one of said bearings rings, the sleeve also having an annular shouldered groove spaced away from said flange, a yieldable retaining ring located in the groove and bearing against said shoulder and the other of said bearing rings to yieldably position the bearing and hold it in assembled relation, an outer bearing ring having confronting conical race surfaces, and balls in the raceway between the race surfaces, the outer bearing ring having a flange for cooperation with a clutch shifter.

10. A clutch-releasing bearing adapted for cooperation with a shifter sleeve, and comprising separate inner rings mounted on the sleeve and provided with confronting conical race surfaces, the sleeve being provided with a flange engaging and positively locating one of said bearing rings, the sleeve also having an annular shouldered groove spaced away from said flange, a yieldable retaining ring located in the groove and bearing against said shoulder and the other of said bearing rings to yieldably position the bearing and hold it in assembled relation, an outer bearing ring having confronting conical race surfaces, and balls in the raceway between the race surfaces, the outer ring being provided with a lubricating fitting communicating with the raceway formed therein between the race surfaces.

11. A clutch-releasing bearing adapted for cooperation with a shifter sleeve, and comprising separate inner rings mounted on the sleeve and provided with confronting conical race surfaces, the sleeve being provided with a flange engaging and positively locating one of said bearing rings, said bearing ring having a flange adapted to overlie said flange, the sleeve also having an annular shouldered groove spaced away from said flange, a yieldable retaining ring located in the groove and bearing against said shoulder and the other of said bearing rings to yieldably position the bearing and hold it in assembled relation, an outer bearing ring having confronting conical race surfaces, and balls in the raceway between the race surfaces.

12. A clutch-releasing bearing adapted for cooperation with a shifter sleeve, and comprising separate inner rings mounted on the sleeve and provided with confronting conical race surfaces, the sleeve being provided with a flange engaging and positively locating one of said bearing rings, the sleeve also having an annular shouldered groove spaced away from said flange, a yieldable retaining ring located in the groove and bearing against said shoulder and the other of said bearing rings to yieldably position the bearing and hold it in assembled relation, said last-named bearing ring having a flange normally overlying said yieldable retaining ring, an outer bearing ring having confronting conical race surfaces, and balls in the raceway between the race surfaces.

13. A clutch-releasing bearing adapted for cooperation with a shifter sleeve and comprising separate inner rings mounted on the sleeve and provided with confronting conical race surfaces, the sleeve being provided with a flange engaging and positively locating one of said bearing rings, the sleeve also having an annular shouldered groove spaced away from said flange, a retaining ring of flat spring metal in sinuous formation located in the groove and bearing against said shoulder and the other of said inner bearing rings to yieldably position the bearing and hold it in assembled relation, an outer bearing ring having confronting conical race surfaces, and a full complement of balls in the raceway between said race surfaces.

14. A thrust bearing and mounting adapted for clutch shifting and comprising a shifter sleeve having spaced annular grooves near one end thereof, separate inner bearing rings mounted on the sleeve and having confronting conical race surfaces, a split retaining ring located in the outward one of said grooves and positively retaining the outward one of said bearing rings in position, a spring retainer of flat sheet metal in sinuous formation located in the other one of said grooves and yieldably holding the inward one of said inner bearing rings in position, an outer bearing ring having integrally formed confronting conical race surfaces, and balls in the raceway between said race surfaces.

15. A thrust bearing and mounting adapted for clutch shifting and comprising a shifter sleeve having spaced annular grooves near one end thereof, separate inner bearing rings mounted on the sleeve and having confronting conical race surfaces, a split retaining ring located in the outward one of said grooves and positively retaining the outward one of said bearing rings in position, a spring retainer of flat sheet metal in sinuous formation located in the other one of said grooves and yieldably holding the inward one of said inner bearing rings in position, one of said inner bearing rings having a flange overlying its adjacent retaining member, an outer bearing ring having integrally formed confronting conical race surfaces, and balls in the raceway between said race surfaces.

16. A thrust bearing and mounting adapted for clutch shifting and comprising a shifter sleeve having spaced annular grooves near one end thereof, separate inner bearing rings mounted on the sleeve and having confronting conical race surfaces, a split retaining ring located in the outward one of said grooves and positively retaining the outward one of said bearing rings in position, a spring retainer of flat sheet metal in sinuous formation located in the other one of said grooves and yieldably holding the inward one of said inner bearing rings in position, said inner bearing rings each having a flange overlying its adjacent retaining member, an outer bearing ring having integrally formed confronting conical race surfaces, and balls in the raceway between said race surfaces.

Signed at New York city in the county of New York and State of New York this 16th day of March, A. D. 1923.

GEORGE F. KOLB.